United States Patent [19]

Sowa

[11] Patent Number: 4,780,820

[45] Date of Patent: Oct. 25, 1988

[54] CONTROL FLOW COMPUTER USING MODE AND NODE DRIVING REGISTERS FOR DYNAMICALLY SWITCHING BETWEEN PARALLEL PROCESSING AND EMULATION OF VON NEUMAN PROCESSORS

[76] Inventor: Masahiro Sowa, 232-3, Hakoda-cho, Maebashi-shi, Gunma-ken, Japan

[21] Appl. No.: 22,499

[22] Filed: Mar. 9, 1987

Related U.S. Application Data

[63] Continuation of Ser. No. 669,123, Nov. 7, 1984, abandoned.

[51] Int. Cl.[4] ............................................. G06F 15/16
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,614,745 | 10/1971 | Podvin | 364/200 |
| 3,962,706 | 6/1976 | Dennis | 364/200 |
| 3,970,993 | 7/1976 | Finnila | 364/200 |
| 3,978,452 | 8/1976 | Barton et al. | 364/200 |
| 4,229,790 | 10/1980 | Gilliland et al. | 364/200 |
| 4,467,409 | 8/1984 | Potash et al. | 364/200 |
| 4,507,728 | 3/1985 | Sakamoto et al. | 364/200 |
| 4,541,048 | 9/1985 | Propster et al. | 364/200 |
| 4,591,979 | 5/1986 | Iwashita | 364/200 |
| 4,591,981 | 5/1986 | Kassabov | 364/200 |
| 4,594,653 | 6/1986 | Iwashita et al. | 364/200 |

FOREIGN PATENT DOCUMENTS 1445714  8/1976  United Kingdom ............... 364/736

OTHER PUBLICATIONS

K. Hwang, *Computer Architecture & Parallel Processing*, McGraw-Hill, 1984, pp. 674–679, 732–768.
Treleaven et al., "Combining Data Flow and Control Flow Computing", The Computer Journal, vol. 25, No. 2, Feb. 1982, pp. 207–217.
"Control Flow Parallel Computer Architecture", pp. 1–4, Gumma University, Japan, Mar. 1983.
"Design of Assembly Level Language for Control Flow Parallel Computer", pp. 1–9, Gumma University, Japan, Jan. 1984.
Sowa, "Control Flow Parallel Computer", Department of Computer Science, Gumma University, pp. 1–16 W/Translation.

*Primary Examiner*—Archie E. Williams, Jr.
*Assistant Examiner*—Danh Phung
*Attorney, Agent, or Firm*—Foley & Lardner, Schwartz, Jeffery, Schwaab, Mack, Blumenthal & Evans

[57] ABSTRACT

A parallel processing computer comprises at least a memory for storing program as well as data and instructions for executing the program, a plurality of functional units, a node driving register for indicating executable instructions which are allowed to be executed by the functional units, and a mode register giving information to the functional unit as to whether the processing to be executed is of serial nature or parallel nature.

3 Claims, 2 Drawing Sheets

CONTROL FLOW COMPUTER USING MODE AND NODE DRIVING REGISTERS FOR DYNAMICALLY SWITCHING BETWEEN PARALLEL PROCESSING AND EMULATION OF VON NEUMAN PROCESSORS

This application is a continuation of application Ser. No. 669,123 filed Nov. 7, 1984 abandoned.

BACKGROUND OF THE INVENTION

1. Field of the Invention

The present invention in general relates to a parallel processing computer system which performs processings in parallel at machine language level. In more particular, the invention relates to a parallel processing computer system which is additionally capable of executing operations on the basis of the principle adopted in the so-called Von Neuman type computer system, a typical one of serial or sequential processing computers.

2. Description of the Prior Art

Most of the computers which are used at present are operative on the basis of the serial processing principle in accordance with the concept adopted in the Von Neuman type computer system. However, in view of the currently prevailing state in which the computers are employed increasingly in many and various industrial and commercial fields, there exists certainly a great demand for the availability of a computer which can perform processing at very high speed.

In this connection, it is noted that the Von Neuman type computer whose operation is based on the serial processing principle is not inherently suited for the execution of processings which are required to be performed at ultra-high speed. For attaining the high speed processing as demand, the computer should have the capability for performing a plurality of processings in parallel. Under the circumstances, studies and activities are now under way in an attempt to develop an ultra-high speed computer system which is based on the parallel processing principle. In reality, data flow computers, control flow parallel computers and others have already been proposed.

However, most of the hiterto known parallel processing computers suffer drawbacks that the sequence in which instructions are to be executed can not be definitely determined in contrast to the Von Neuman type computer which is inherently designed to execute processings in a deterministic manner, the parallel processing computer may encounter difficulty in the processing of certain input signals so that corresponding output signals can be produced within a predetermined time. Moreover, the processings which are intrinsically to be performed in series or sequence can not be executed by the parallel processing computer without lowering the operation speed in contradiction to the fact that the parallel processing computer has been developed with the aim to increase the operation speed.

Further, the parallel processing computer differs from the conventional computers of Von Neuman type in respect to the basic principle. So, there may arise such a situation that the replacement of the Von Neuman type computer by the parallel processing computer cannot be smoothly realized, particularly in the fields where a great amount of available software developed until now exert important influences on the efficiency of work to be accomplished by using a computer. In other words, the parallel processing computer is incompatible with the Von Neuman type computer in respect to the available software.

SUMMARY OF THE INVENTION

It is therefore an object of the present invention to provide a parallel processing computer which is so arranged as to be capable of performing serial processings in addition to parallel processings, not only non-deterministical processings but also deterministical processings, and further programs prepared for parallel processings, inclusive of serial processings, at such a high speed as that of Von Neuman type serial processing computer so arranged as to perform serial processings.

Another object of the present invention is to provide a parallel processing computer which can make use of a great amount of currently available software so that the transfer or replacement of the Von Neuman type serial processing computer by the parallel processing computer can take place smoothly.

In view of the above and other objects which will be more apparent as the description proceeds, there is provided according to a general aspect of the invention a parallel processing computer which comprises at least a memory for storing data and instructions, a plurality of functional units, a node driving register means for indicating instructions which are allowed to be executed, and a mode register for indicating to each functional unit whether processing in concern is of a serial nature or a parallel nature.

With the arrangement of the parallel processing computer described above, it is assumed that a given one of the functional units fetches an executable instruction from the memory which instruction is designed by one word contained in the node driving register in the course of parallel processing which is represented by a mode indentifier "P" placed in the mode register. In that case, when the instruction as read out indicates initiation of the serial processing (e.g. Von Neuman type processing), an identifier "N" representative of the serial or Von Neuman processing is loaded in the mode register. Thereafter, the node driving register is used only for the given functional unit mentioned above and one word of the node driving register may serve as a program counter for a serial computer cooperates to perform the function corresponding to that of the central processing unit (CPU) of the Von Neuman type computer. When a return instruction is issued to the given functional unit, the latter as well as a part of the node driving register operating as the Von Neuman type computer is restored as the parts constituting the parallel processing computer, whereupon "P" is loaded in the mode register.

With the arrangement described above, the switching to the Von Neuman type or serial processing computer can be realized in a much simplified manner. Further, since a plurality of Von Neuman type computers can be simultaneously realized in a single parallel processing computer, Von Neuman type program or programs can be executed simultaneously with the execution of a program for the parallel processing.

DESCRIPTION OF THE PREFERRED EMBODIMENTS

Figure 2:
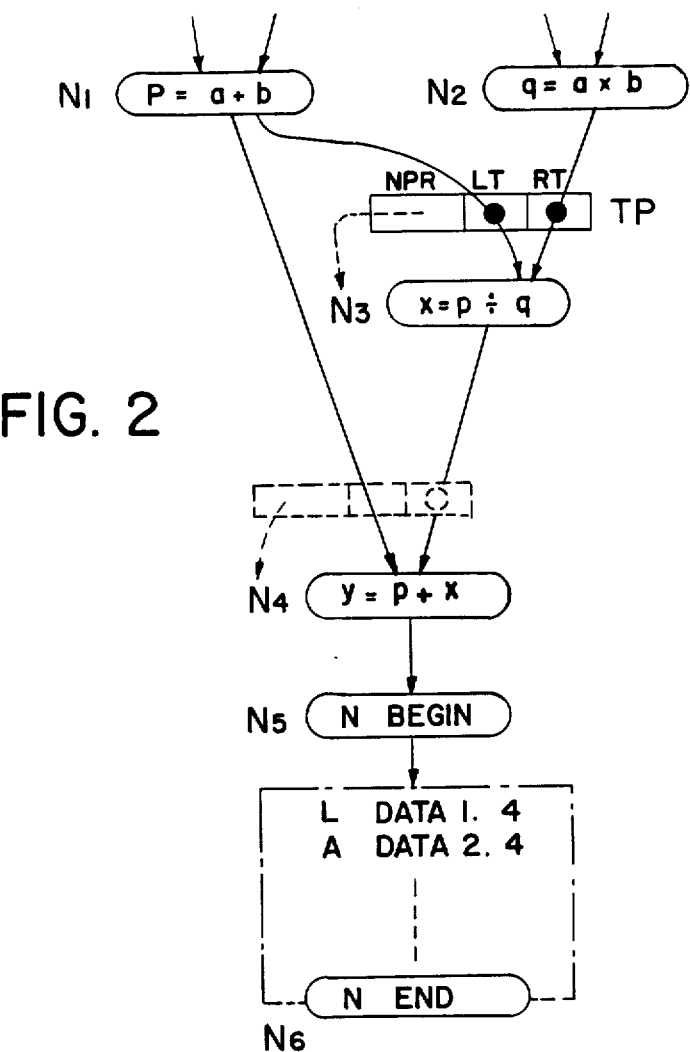
FIG. 2 is a program graph for illustrating operation of the parallel processing computer shown in FIG. 1.

In the first place, the principle on the basis of which the parallel processing computer according to the invention operates will be elucidated by referring to a program graph shown in FIG. 2.

Reference symbols $N_1$ to $N_4$ represent what is referred to as nodes which may be stored in a memory, and which contain contents to be processed. Arrows shown on the input side of each node are referred to as the input arcs in accordance with graph theory while the outgoing arrows on the output side of each node are referred to as the output arcs.

The principle of this computer is that processing of the content placed in each node N is allowed to be executed only when tokens indicative of "control of execution", meaning whether said content of the node should be processed or not (shown in solid circle in FIG. 2), are placed on all the input arcs of the node in concern. Upon completion of the processing by fetching the control tokens from the input arcs, another token is outputted on the output arc.

The token to be inputted to a given node constitutes a so-called token packet TP together with a node pointer NPR indicating the existence or address of the given node in the memory, the token packet being stored in a node driving register or NDR 1 described thereinafter. In FIG. 2, LT represents a left token, and RT represents a right token.

In the case of the program illustrated in FIG. 2, arithmetic operation is executed through the nodes $N_1$ to $N_4$ in accordance with $$y = \frac{a+b}{a \times b} + a + b$$

Figure 1:
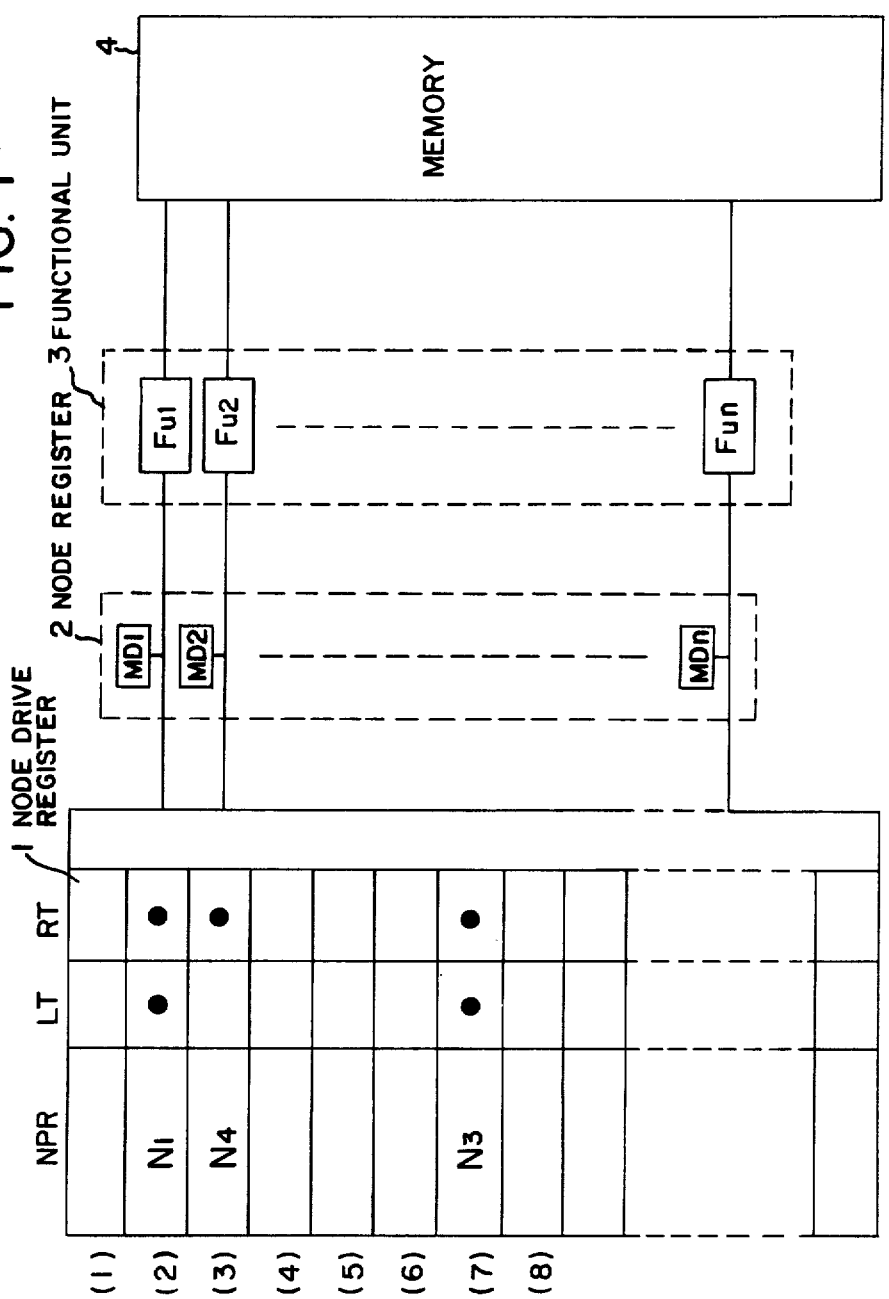
FIG. 1 shows in a block diagram a general arrangement of a parallel processing computer according to an exemplary embodiment of the invention.

Now, reference is made to FIG. 1 which shows a hardware architecture of a control flow parallel processing computer according to an embodiment of the invention. In the figure, a reference numeral 1 denotes the node driving register (NDR) mentioned above, 2 denotes mode registers ($MD_1$ to $MD_n$) for placing therein signals commanding the parallel processing or Von Neuman type processing, 3 denotes an assembly of functional units ($FU_1$, $FU_2$, ... $FU_n$) for performing the processings on the node basis, and 4 denotes a memory (M) for storing instructions to be executed at the nodes and date used for executing the instructions.

Assuming that all the mode registers $MD_1$, $MD_2$, ..., $MD_n$ contain the mode identifier "P" indicating the parallel processing mode, the functional units $FU_1$, $FU_2$, ..., $FU_n$ of the computer operate as follows.

At first, the functional units fetch from the node driving register 1 the token packets TP each containing enough tokens for executing the processing at the nodes (1st Step).

By way of example, assuming that the functional unit $FU_2$ fetches the token packet TP to be inputted to the node $N_3$ shown in FIG. 2 from the seventh word NDR (7) of the node driving register 1, the corresponding introduction and data designated by the node pointer NPR contained in the token packet are read out from the memory 4 (2nd Step).

Subsequently, arithmetic operation is carried out in accordance with, e.g. $x = p \div q$, under command of the instruction read out from the memory 4 by using the data also read out from said memory 4 (3rd step).

After the completion of the arithmetic operation, the output token to the node $N_4$ is combined with the node pointer designating the node $N_4$ (shown in broken line block in FIG. 2) to thereby prepare a token packet TP which is then placed in the node driving register NDR 1 as for example, 3rd word (3) (4th step).

The token packets written in the node driving register 1 and including the same node pointer NP are stored in a set (5th step).

Operations of the kind mentioned above are performed by the function units 3 independent of one another, whereby the program is executed in parallel.

Now, it is assumed that the instruction read out from the memory 4 at a certain step for executing the processing commands initiation of a Von Neuman type program (N BIGIN) as designated at the node $N_5$. Then, the functional unit $FU_2$ places the mode identifier "N" at the associated mode register $MD_2$, as the result of which the seventh word (7) of the node driving register 1 is allocated for use only by the functional unit $FU_2$. Thereafter, the node pointer region NPR of the seventh word (7) of the node driving register 1 serves as a program counter of the Von Neuman type computer. In other words, the seventh word (7) of the node driving register 1 constitutes a Von Neuman type computer together with the functional unit $FU_2$ and the memory 4. The Von Neuman type computer may then perform a Von Neuman type program illustrated in a dotted broken line block in FIG. 2. When the execution of the Von Neuman type program comes to an end, e.g. at the node $N_6$, as indicated by "N END", the functional unit $FU_2$ places the mode identifier "P" in the mode register $MD_2$, whereupon the node pointer area of the seventh word (7) of the node driving register 1 gets rid of the functional unit $FU_2$. Thus, the seventh word of the NDR 1 as well as the functional unit $FU_2$ are restored as the members constituting the parallel processing computer and may take parts in the execution of a succeeding parallel processing program.

In a version of the illustrated embodiment, a program counter may be previously incorporated in the functional unit so that the program counter can be used in response to the mode identifier "N" placed in the associated mode register. Further, the illustrated parallel processing computer may serve as a data flow computer by employing data for the token.

Although the invention has been described in conjunction with the preferred embodiment, it should be appreciated that many modifications and variations will readily occur to those skilled in the art without departing from the spirit and scope of the invention.

I claim:

1. A parallel processing computer comprising:
   a plurality of functional units ($FU_1$ ... $FU_n$) for executing instructions in parallel with one another;
   a memory (4) for storing said instructions and data to be utilized in execution of said instructions by said functional units;
   a node driving register (1) for indicating instructions to be executed in parallel by said functional units, respectively;
   a mode register means (2) connected to said functional units for storing information indicative of either a serial and parallel operation mode of said functional units; and
   wherein said node driving register includes a plurality of node pointers, for serving as the program counter in a Von-Neuman processing operation, each of said node pointers (NPR) constituted by at least one word of said node driving register (1) designated by a given one of said functional units (FU$_1$, ..., FU$_n$) connected with said mode register means, which is loaded with serial operation mode information and temporarily allocated for use only by said given one functional unit, to thereby serve as a program counter for a serial type operation of said given functional unit so that a serial type program is executed by said given one functional unit in cooperation with a node pointer and said memory.

2. A parallel processing computer as set forth in claim 1, said mode register means includes a plurality of mode registers (MD$_1$, ..., MD$_n$) each connected to one of said plurality of function units (FU$_1$, ..., FU$_n$), respectively, each mode register storing information indicative of either a parallel or serial operation mode in which the respective functional units are to execute respective instructions.

3. A parallel processing computer as set forth in claim 1, wherein execution of instruction is controlled by a token which simultaneously represents data to be used in executing said instruction.

* * * * *